Jan. 11, 1944. L. L. SALFISBERG Re. 22,418

GUMMED TAPE DISPENSER AND APPLIER

Original Filed April 9, 1942 2 Sheets-Sheet 1

INVENTOR
Leroy L. Salfisberg
BY
Harry N. Cook
ATTORNEY

Jan. 11, 1944. L. L. SALFISBERG Re. 22,418

GUMMED TAPE DISPENSER AND APPLIER

Original Filed April 9, 1942 2 Sheets-Sheet 2

INVENTOR
Leroy L. Salfisberg.
BY
Harry Nolock,
ATTORNEY

Reissued Jan. 11, 1944 Re. 22,418

UNITED STATES PATENT OFFICE 22,418

GUMMED TAPE DISPENSER AND APPLIER

Leroy L. Salfisberg, South Orange, N. J., assignor, by mesne assignments, to Minnesota Mining and Manufacturing Company, St. Paul, Minn., a corporation of Delaware Original No. 2,317,943, dated April 27, 1943, Serial No. 438,267, April 9, 1942. Application for reissue November 13, 1943, Serial No. 510,097

16 Claims. (Cl. 216—29)

This invention relates to a machine for dispensing and for applying to an article such as a package, adhesive strips or sheets, for example, normally tacky or pressure-sensitive adhesive tape sold under the trade-mark "Scotch."

Prime objects of the invention are to provide a machine which shall embody novel and improved means for dispensing pieces of tape of predetermined length into a predetermined position to be engaged by a portion of an article, such as a package, upon movement of the latter in one direction, and means operable by and upon said movement of said article for applying said piece of tape to the article; and to provide such a machine wherein the last-named means shall also actuate the means for dispensing the tape, whereby the machine shall be simple and inexpensive in construction and operation and shall be reliable and durable.

Another object is to provide such a machine in which all of the motive power necessary to operate it in normal use is supplied by the movement of the articles that are taped or sealed.

Another object is to provide a machine of this character which can be manually operated by a relatively unskilled operator and with a minimum of attention and physical effort.

A further object is to provide in a machine of the general character described novel and improved means for withdrawing in succession predetermined lengths of tape from a roll or strip, for severing pieces of the tape from the roll or strip, and for projecting and holding the severed pieces in position to be engaged by an article to which the piece of tape is to be applied.

Other objects, advantages and results of the invention will be brought out by the following description in conjunction with the accompanying drawings in which Figure 1 is a top plan view of a gummed tape applicator embodying my invention, with portions broken away and shown in section for clearness in illustration.

Figure 2:
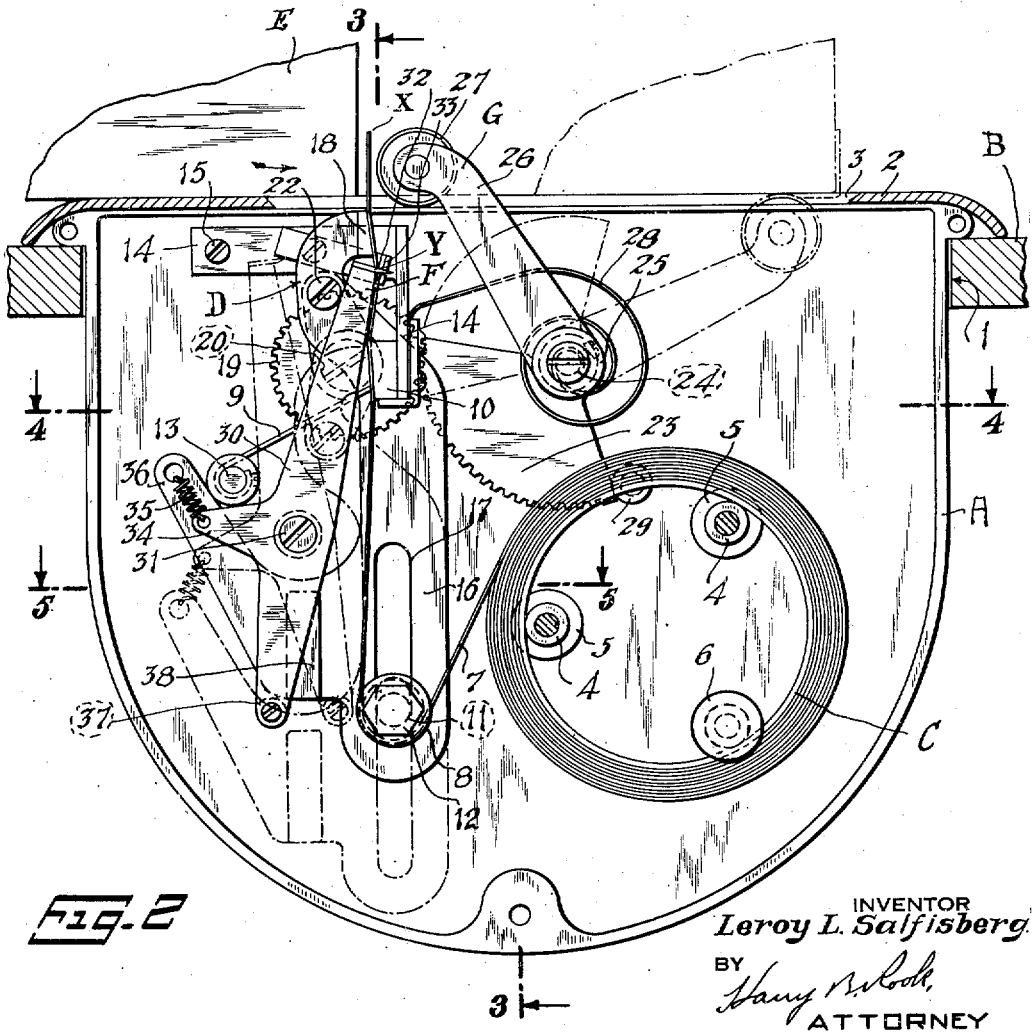
Figure 2 is a vertical sectional view on the line 2—2 of Figure 1.
Figure 6:
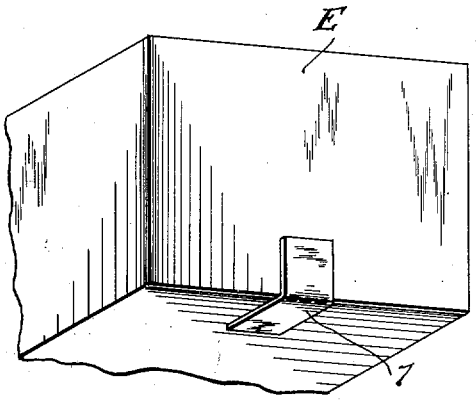
Figure 3:
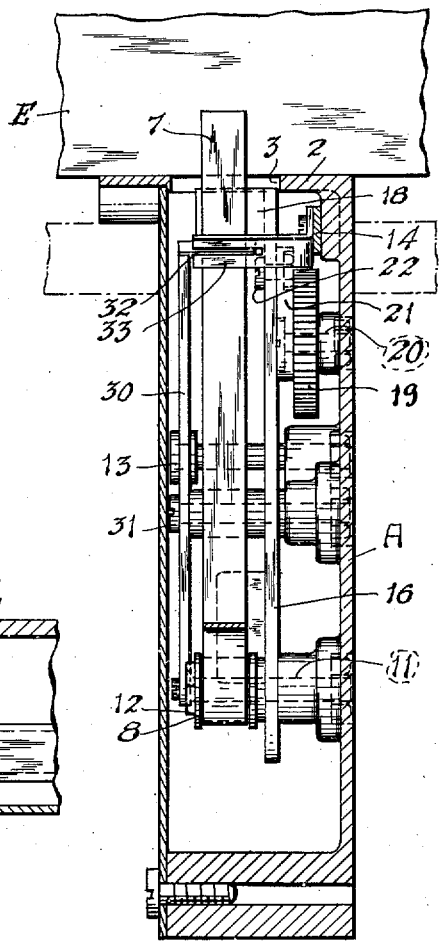
Figure 3 is a transverse vertical sectional view on the line 3—3 of Figure 2.
Figure 5:
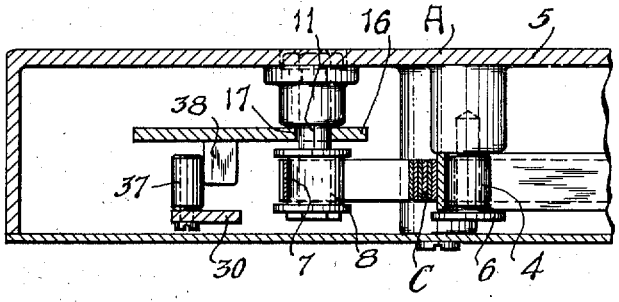
Figure 4:
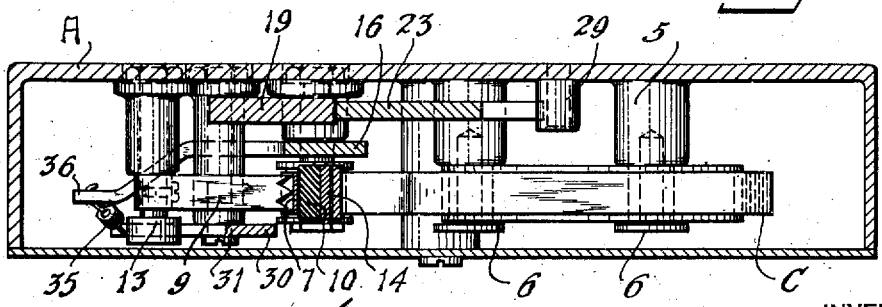

Figures 4 and 5 are horizontal sectional views on the lines 4—4 and 5—5, respectively, of Figure 2, and Figure 6 is a fragmentary perspective view of one end of a package or box having a piece of adhesive tape applied thereto, showing the manner in which the machine of the invention applies a piece of adhesive tape.

Specifically describing the illustrated embodiment of the invention, the gummed tape applier includes a case A that may be mounted on any suitable support in any suitable manner, but is shown as set into a hole 1 in the top of a table or like support B. The casing has a top wall 2 disposed slightly above the top side of the support B and having an opening 3 through which the tape to be applied is projected and an applier for the tape is operated.

Within the casing are suitable supports, in the present instance rollers 4, for a roll C of adhesive tape, the rollers being shown as mounted on cap screws secured in bosses 5 in the casing, the heads 6 of the cap screws serving to hold the roll of tape on the rollers between said heads and the ends of the bosses.

One type of adhesive tape with which my applier may be utilized is what is known as "Scotch" tape which generally comprises a strip of crepe paper, Cellophane, or the like to one side of which is applied a normally tacky or pressure-sensitive adhesive. Tape can be unwound from the roll without transfer or offsetting of the adhesive and the adhesive may be caused to adhere to a surface by simple application of pressure and without activation of the adhesive as by water, solvents or heat. The strip 7 of adhesive material is unwound from the roll C and passes downwardly and then upwardly around a guide roller 8 and between a guide spring 9 and a block 10, whereby the tape may be guided and pulled upwardly through the opening 3 in the top wall of the casing. The roller 8 is mounted on a stud 11 and is held thereon by a cap screw 12. The spring 9 is mounted on a stud 13 and the block 10 is mounted on an angle bracket 14 which is secured by screws 15 to one wall of the casing.

Within the casing is also arranged a means generally designated D for feeding the strip 7 of adhesive material so as to locate the free end portion thereof in a predetermined position to be engaged by an article such as a package or box E upon movement of the latter in one direction as shown by the arrow in Figure 2. Cooperating with the feeding means D is a means F for severing a piece of the adhesive material from the strip, and means G also is provided for applying the severed piece of adhesive material to the box E. As shown, preferably this means G also serves as the actuator for the feeding means D.

The feeding means comprises a carrier 16 which is in the form of a flat bar and has a longitudinal slot 17 through which passes the stud 11 so that the carrier is slidably reciprocable. One end of the carrier has a head 18 which at its lower limit of movement is pressed into adhesive contact with the strip 7 at the side thereof opposite the block 10 and during its upward movement pulls the strip from the roll C. At its upper limit of movement the head 18 holds the free end of the strip 7 in position to be engaged by the box E.

The means for actuating the carrier 16 includes a gear 19 mounted on a stud 20 in the casing and rigidly connected to a crank arm 21 which is pivotally connected at 22 to the carrier 16. Meshing with the gear 19 is a gear segment 23 which rotates about a stud 24 and is rigidly connected to the hub 25 of a bifurcated presser lever 26 between the arms of which is a presser roller 27. The lever 26 normally is influenced by a spiral spring 28 so as to locate the roller 27 in juxtaposition to and at the side of the free end of the strip 7 opposite that against which the box E is moved. A stop stud 29 limits the movement of the lever 26 under the influence of the spring 28.

Figure 1:
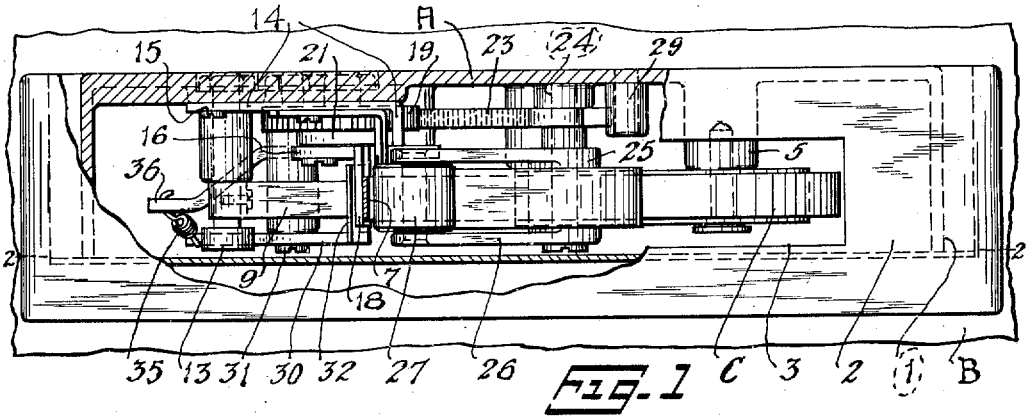

In operation of the machine so far described the parts normally are in the position shown by solid lines in Figure 1 with the end of the adhesive strip projecting through the opening 3 as indicated at X and with the end portion of the strip severed from the main strip at Y. The operator pushes the box E to which adhesive tape is to be applied along the top of the casing A in the direction of the arrow as shown by solid lines in Figure 2 whereupon the adhesive tape is pressed between the roller 27 and the end of the box so that the tape is adhesively attached to the box. Then the operator continues to move the box in the same direction against the influence of the spring 28 which pulls the piece of tape off the head 18 of the carrier and causes the roller 27 to be moved by and with the box until the roller is forced downwardly through the opening 3 as shown by dot and dash lines in Figure 2. At the same time, the roller rolls over the piece of adhesive tape so as to securely attach the latter to the box.

During this operation, the carrier 16 has been moved downwardly by the gear segment 23, gear 19 and crank arm 21 so as to bring the head 18 of the carrier into contact with the tape at the side of the tape opposite the block 10. The tape thus is adhesively attached to the carrier.

Preferably the block 10 is of rubber to facilitate the operation.

When the box is lifted by the operator, the lever 26 will be swung in the other direction under the influence of the spring 28 into its normal position. At the same time, the carrier will be moved upwardly with the strip 7 attached thereto so as to again project the end of the strip through the opening 3.

In accordance with the invention, the strip is severed at this time as shown in Figure 2. The severing means includes a lever 30 which is pivotally mounted intermediate its ends at 31 on the casing and has a knife blade 32 at its upper end to cooperate with a slotted cutting block 33. The lever 30 has a lateral arm 34 that is connected by a spring 35 to an arm 36 on the carrier 16, said spring serving to actuate the lever 30 in each direction as the carrier 16 moves to its respective limits of movement.

More particularly the knife blade normally is in cutting relation to the block 33 so as to sever the strip as shown in Figure 2. As the strip is applied to the box E and the carrier 16 is lowered, the lever 30 is held against movement by engagement of a roller 37 on the lever 30 with a stop block 38 on the carrier, but when the carrier reaches its lower limit of movement, the block 38 is moved out of abutting relation to the roller 37 so that the roller may swing above the block and permit movement of the lever 30 under the influence of the spring 35 in such a manner as to withdraw the knife blade from the cutting block and the strip as shown by dot and dash lines in Figure 2. Movement of the knife lever is limited by engagement with the stud 13. Then upon movement of the carrier upwardly, the lever 30 is held in its inoperative position by engagement of the roller 37 with the opposite side of the stop block 38 until the carrier has reached its uppermost or normal position, whereat the block is out of abutting relation to the roller 37 so that the knife lever 30 may be swung by the spring 35 into operative position with the blade 32 entering the slot of the block 33 so as to cut the strip and sever a piece of predetermined length therefrom as shown by solid lines in Figure 2.

Having thus described my invention, what I claim is:

1. A machine of the character described comprising means for feeding a piece of adhesive tape into a predetermined position to be engaged by an article upon movement of the latter thereagainst, means for applying said piece of tape to said article upon said movement, and mechanical driving means connecting said feeding means and said applying means whereby operation of the latter produces a further operation of the feeding means to automatically position a further piece of tape.

2. A machine of the character described comprising means for feeding a piece of adhesive tape into a predetermined position to be engaged by an article upon movement of the latter thereagainst, means movable in response to pressure of the article thereagainst for applying said piece of tape to said article upon said movement of the article, and a mechanical driving mechanism connected between said feeding means and said applying means for actuating said feeding means such that the latter is powered by the said movement of the article to feed a further piece of adhesive tape.

3. A machine of the character described comprising means for feeding a strip of adhesive material longitudinally to locate its free end portion in a predetermined position to be engaged by an article upon movement of the latter in one direction, said feeding means including a movable carrier which at one limit of its movement picks up said strip of adhesive material and at the other limit locates the free end of said strip in said predetermined position, means for severing a piece of said strip at said free end portion, means for applying said piece of material to said article including a presser normally disposed at the side of said piece of material opposite said article so that said piece of adhesive material will be pressed between said article and said presser and thus adhesively attached to the article upon movement of said article in said direction, said presser being movable by and with said article during continuation of said movement of the article, means for actuating said presser in the other direction into normal position, and an operative connection between said presser and said feeding means for actuating said carrier from the first-mentioned limit of its movement to the second-mentioned limit as said presser is moved by said article.

4. An automatic pressure-sensitive adhesive tape dispenser and applier comprising a dispensing mechanism for withdrawing pressure-sensitive adhesive tape from a roll and feeding successive pieces into a predetermined applying position ready for engagement by an article upon movement of the latter toward and against the tacky side of a positioned piece of tape, means for applying the positioned piece of tape to the article including a movable presser normally disposed at the back of the piece of tape and adapted to be moved by the article when the latter is moved against the piece of tape and presser, means for restoring the presser to normal position following application of the piece of tape to the article, and mechanical driving means actuated by movement of said movable presser for driving said dispensing mechanism to automatically feed a further piece of tape to applying position following application of the preceding piece of tape, movement of the articles providing the source of power for operating the dispenser in normal use.

5. A machine of the character described, comprising means for guiding a strip of tape, means for feeding said strip longitudinally including a carrier movable longitudinally of said strip and having a head which at one limit of its movement picks up said strip and at the other limit locates the free end of the strip at a predetermined point, means for severing a piece from said strip at the side of said head opposite the free end of the strip when said head is at the second-mentioned limit of its movement, and an operative connection between said carrier and said severing means for actuating the latter.

6. A machine of the character described, comprising means for guiding a strip of tape, means for feeding said strip longitudinally including a carrier movable longitudinally of said strip and having a head which at one limit of its movement picks up said strip and at the other limit locates the free end of the strip at a predetermined point, means for severing a piece from said strip at the side of said head opposite the free end of the strip when said head is at the second-mentioned limit of its movement, said severing means including a movable blade, and a tension spring connecting said carrier and said blade so that as said carrier moves from the first-mentioned to the second-mentioned limit and from the second-mentioned to the first-mentioned limit, said spring tends to actuate said blade into operative and inoperative positions, respectively, and cooperating means on said carrier and said blade to restrain the blade against movement during said movements of said carrier and to release said blade for movement when said carrier is at its respective limits of movement.

7. A machine of the character described, comprising means for guiding a strip of tape, means for feeding said strip longitudinally including a carrier movable longitudinally of said strip and having a head which at one limit of its movement picks up said strip and at the other limit locates the free end of the strip at a predetermined point, means for severing a piece from said strip at the side of said head opposite the free end of the strip when said head is at the second-mentioned limit of its movement, said severing means including a movable blade, and a tension spring connecting said carrier and said blade so that as said carrier moves from the first-mentioned to the second-mentioned limit and from the second-mentioned to the first-mentioned limit said spring tends to actuate said blade into operative and inoperative positions, respectively, and cooperating members on said carrier and said blade normally abutting each other to restrain movement of said blade during said movements of said carrier, said member on the carrier being moved out of abutment with said member on said blade to release the blade for movement when the carrier is at its respective limits of movement.

8. A machine of the character described comprising means for guiding a strip of adhesive tape having a pressure-sensitive adhesive on one side exposed, a carrier movable longitudinally of the strip and having a head which at one limit of its movement is pressed into adhesive contact with said strip and during movement to its other limit feeds said strip to locate its free end in a predetermined position to be engaged at its adhesive side by an article upon movement of the latter in one direction, means for actuating said carrier, means for severing a piece of material from said strip, and means for applying said piece of material to said article including a presser normally disposed at the side of said piece of material opposite said article so that said piece of adhesive material will be pressed between said article and said presser and thus adhesively attached to the article upon movement of said article in said direction, said presser being movable by and with said article during continuation of said movement of the article, means for actuating said presser in the other direction into normal position, and an operative connection between said presser and said severing means for actuating the latter.

9. The machine set forth in claim 2 wherein said presser is pivotally mounted and said operative connection between said presser and said feeding means includes a gear segment rotatable by said presser and coaxially with said pivotal connection, a second gear, and a crank connection between said second gear and said feeding means.

10. The machine set forth in claim 3 wherein said presser is pivotally mounted and said operative connection between said presser and said feeding means includes a gear segment rotatable by said presser and coaxially with said pivotal connection, a second gear, and a crank connection between said second gear and said carrier of the feeding means.

11. A machine of the character described comprising means for feeding a strip of adhesive material to locate its free end portion in a predetermined position to be engaged by an article upon movement thereof in one direction, means for severing a piece of material at the free end portion of said strip, means for applying said piece of material to said article including a presser normally disposed at the side of said piece of material opposite said article so that said piece of adhesive material will be pressed between said article and said presser and thus adhesively attached to the article upon movement of said article in said direction, said presser being movable by and with said article during continuation of said movement of the article, means for actuating said presser in the other direction into normal position, and an operative connection between said presser and said severing means for actuating the latter.

12. A machine of the character described comprising means for feeding a strip of adhesive material to locate its free end portion in a predetermined position to be engaged by an article upon movement thereof in one direction, including a carrier movable longitudinally of said strip and having a head which at one limit of its movement picks up said strip and at the other limit locates the free end of the strip at a predetermined point, means for severing a piece from said strip at the side of said head opposite the free end of the strip when said head is at the second-mentioned limit of its movement, said severing means including a movable blade, means for applying said piece of material to said article including a presser normally disposed at the side of said piece of material opposite said article so that said piece of adhesive material will be pressed between said article and said presser and thus adhesively attached to the article upon movement of said article in said direction, said presser being movable by and with said article during continuation of said movement of the article, means for actuating said presser in the other direction into normal position, an operative connection between said presser and said carrier for actuating the carrier, and an operative connection between said carrier and said blade for actuating the latter.

13. A machine of the character described comprising a support, means for feeding a strip of material to locate its free end portion in a predetermined position, including a movable carrier having a head which at one limit of its movement picks up said strip and at the other limit locates the free end of the strip at a predetermined point, means for severing said strip at the side of said head opposite the free end of the strip when said head is at the second-mentioned limit of its movement, means for actuating said carrier including a lever pivotally mounted on said support and an operative connection between said lever and said carrier for moving the latter to one limit of its movement as said lever swings in one direction and to move said carrier to the other limit of its movement as said lever moves in the other direction.

14. The machine set forth in claim 13 wherein said severing means includes a movable blade and with the addition of an operative connection between said blade and said carrier for actuating the blade.

15. A machine of the character described comprising means for guiding a strip of adhesive tape having a pressure-sensitive adhesive on one side exposed, a reciprocable carrier having a head which at one limit of its movement is pressed into adhesive contact with said strip and during movement to its other limit feeds said strip to locate its free end in a predetermined position to be engaged at its adhesive side by an article upon movement of the latter in one direction, means for severing said strip at the side of said head opposite said free end of the strip so that the end portion of the strip thus separated from the strip will be held by said head of the carrier, and means for applying said piece of material to said article including a presser normally disposed at the side of said piece of material opposite said article so that said piece of adhesive material will be pressed between said article and said presser and thus adhesively attached to the article and pulled from said head of the carrier upon movement of said article in said direction, said presser being movable by and with said article during continuation of said movement of the article, means for actuating said presser in the other direction into normal position, and means operatively connecting said presser, said carrier and said severing means for actuating said carrier and said severing means by and upon movement of said presser.

16. A machine of the character described comprising means for guiding a strip of adhesive tape having a pressure-sensitive adhesive on one side exposed, a reciprocable carrier having a head which at one limit of its movement is pressed into adhesive contact with said strip and during movement to its other limit feeds said strip to locate its free end in a predetermined position to be engaged at its adhesive side by an article upon movement of the latter in one direction, means for severing said strip at the side of said head opposite said free end of the strip so that the end portion of the strip thus separated from the strip will be held by said head of the carrier, and means for applying said piece of material to said article including a presser normally disposed at the side of said piece of material opposite said article so that said piece of adhesive material will be pressed between said article and said presser and thus adhesively attached to the article and pulled from said head of the carrier upon movement of said article in said direction, said presser being movable by and with said article during continuation of said movement of the article, means for actuating said presser in the other direction into normal position, an operative connection between said presser and said carrier for actuating the latter, and an operative connection between said carrier and said severing means for actuating said severing means.

LEROY L. SALFISBERG.